United States Patent [19]

Murakami et al.

[11] Patent Number: 5,791,433
[45] Date of Patent: Aug. 11, 1998

[54] VARIABLE THROTTLE VALVE WITH ECCENTRIC MEMBERS, FOR USE IN HYDRAULIC STEERING DEVICE

[75] Inventors: Tetsuya Murakami, Kashihara; Yasuhiro Tomago, Yamato-Takada; Hiroto Sasaki, Kitakatsuragi-gun; Masanobu Inoue, Yamato-Takada, all of Japan

[73] Assignee: Koyo Seiko Co., Ltd., Osaka, Japan

[21] Appl. No.: 533,012

[22] Filed: Sep. 25, 1995

[30] Foreign Application Priority Data

Oct. 4, 1994 [JP] Japan .................. 6-266272
Jun. 1, 1995 [JP] Japan .................. 7-160074

[51] Int. Cl.⁶ .................. B62D 5/08; F16H 25/20
[52] U.S. Cl. .................. 180/417; 251/276; 251/267; 74/89.15
[58] Field of Search .................. 180/417, 441, 180/421, 422, 423, 427; 251/264, 266, 272, 276, 278, 275, 267, 273, 274; 74/89.15, 459

[56] References Cited

U.S. PATENT DOCUMENTS

| 3,776,505 | 12/1973 | Nakanishi | 251/163 |
| 4,629,025 | 12/1986 | Brasier et al. | 180/422 |
| 4,637,484 | 1/1987 | Ijiri et al. | 180/422 |
| 4,723,453 | 2/1988 | Kannapan et al. | 74/89.15 |
| 4,730,687 | 3/1988 | Chikuma et al. | |
| 4,790,401 | 12/1988 | Sonoda | 180/422 |
| 4,984,766 | 1/1991 | Maeda | 251/129 |
| 5,332,055 | 7/1994 | Emori et al. | 180/422 |
| 5,447,209 | 9/1995 | Sasaki et al. | 180/422 |

FOREIGN PATENT DOCUMENTS 0 612 652 A1  8/1994  European Pat. Off.
62-23171      2/1987  Japan.

*Primary Examiner*—Brian L. Johnson
*Assistant Examiner*—Gary Savitt
*Attorney, Agent, or Firm*—Reid & Priest LLP

[57] ABSTRACT

A screw member is screwed into a spool which is axially movably inserted into a housing. The opening of the throttling portion of a variable throttle valve is varied according to the axial shifting of the spool according to the rotation of the screw member. The centerline of the screw member is eccentric to the centerline of the spool. The eccentricity prevents the spool from rotating together with the screw member.

4 Claims, 12 Drawing Sheets

VARIABLE THROTTLE VALVE WITH ECCENTRIC MEMBERS, FOR USE IN HYDRAULIC STEERING DEVICE

FIELD OF THE INVENTION

The present invention relates to a variable throttle valve having a throttling portion whose opening varies according to an axial displacement of a valve spool, and also relates to a hydraulic power steering device having such a throttle valve.

DESCRIPTION OF THE RELATED ART

The hydraulic power steering device employs a hydraulic control valve having a plurality of throttling portions whose openings are changed according to steering resistance. Hydraulic oil pressure acting on a hydraulic actuator for generating steering assist force is controlled by varying the openings of the throttling portions according to steering resistance.

The relationship between the hydraulic oil pressure acting on the actuator and steering resistance is changed according to driving conditions, such as vehicle's speed, angle of steer, and the like. Thus, reliability of steering operation is improved at high driving speeds, and responsiveness of steering operation is improved at low driving speeds. The plurality of throttling portions in the hydraulic control valve are divided into a first group and second group, and the rate of change of hydraulic oil pressure according to change of steering resistance in the first group throttling portions is larger than that in the second group throttling portions. The ratio of the flow rate controlled by the first group throttling portions to the flow rate controlled by the second group throttling portions is changed according to driving conditions, such as vehicle's speeds, angle of steer, and the like. To change the ratio, a variable throttle valve whose opening varies according to such a driving condition is connected to the hydraulic control valve (reference is made to the Official Journal of the European Patent Office No. 0612652A1).

A throttle valve, which comprises a housing, a spool which is axially movably inserted into the housing, a screw member screwed into the spool, an actuator for rotating the screw member, and a throttling portion whose opening is varied by the axial shifting of the spool as a result of the rotation of the screw member, is available as such a throttle valve (U.S. Pat. No. 4730687 and Unexamined Japanese Utility Model Application sho No. 62-23171). The angle of rotation of the screw member is varied by the actuator such as a stepping motor, or the like according to the driving conditions such as vehicle's speeds, angle of steer, and the like. By varying the angle of rotation of the screw member to vary the opening of the throttling portion, the pressure and flow rate of the hydraulic oil passing through the throttling portion can be controlled.

To control the opening of the throttling portion precisely, the above prior art throttle valve is provided with a locking member, which prevents the spool from rotating relative to the housing, so that the spool is prevented from rotating together with the screw member. Also, a spring is provided to urge axially the spool so that the spool may not be shifted due to clearance between the threads of the screw member and the threads of the spool.

Since the prior art throttle valve needs the locking member, its component count is increased, and its structure and assembling are complicated. Thus, manufacturing steps and cost are increased.

It can be contemplated that axially extending flat surfaces are machined on the outer circumference of the spool and the inner circumference of the housing by using a milling cutter, and the like. Both flat surfaces are engaged to prevent the spool from rotating relative to the housing, so that the spool is prevented from rotating together with the screw member. However, machining of such flat surfaces increases the manufacturing steps and cost.

To assure smooth rotation of the screw member, some clearance is required between the threads of the screw member and the threads of the spool. However, if such a clearance causes the spool to be axially shifted, no precision control of the opening of the throttling portion is achieved. Without precision control, desired steering characteristics can not be obtained in the above hydraulic power steering device. Therefore, the spring is used to urge axially the spool. However, the mounting of such a spring into the housing complicates the manufacturing steps. To control the opening of the throttling portion precisely, a reference position of the shifting of the spool must be accurately set. However, the prior art cited above fails to disclose means for setting the reference position.

The above actuator for driving the screw member is mounted external to the housing. The actuator is thus sealed to keep out rain drops, muddy water splash, and the like in the hydraulic power steering. In the prior art, the actuator is enclosed by a covering of synthetic resin, rubber, or the like. However, a simple covering is not sufficient enough to provide the waterproof seal. The waterproof seal may be achieved by pouring synthetic resin into a mold that holds the actuator and hardening the synthetic resin to embrace the actuator. However, this structure heightens manufacturing cost.

It is an object of the present invention to provide a variable throttle valve free from the above problems and a hydraulic power steering device that incorporates the variable throttle vale.

SUMMARY OF THE INVENTION

The variable throttle valve according to the present invention comprises a housing, a spool which is axially movably inserted into the housing, a screw member screwed into the spool, an actuator for rotating the screw member, and a throttling portion whose opening is varied by the axial shifting of the spool as a result of the rotation of the screw member, wherein the centerline of the spool is eccentric to the centerline of the screw member. According to the variable throttle valve of the present invention, the centerline of the spool is eccentric to the centerline of the screw member, so that the spool is prevented from rotating together with the screw member. As a result, there is no need to provide dedicated components or machining steps for the flat surfaces to prevent the rotation of the spool together with the screw member. Therefore, no extra components are required and its structure and assembling remain simple, so that manufacturing steps and cost are reduced.

Preferably, means for exerting an axial elastic force on the spool is provided. By exerting the axial elastic force on the spool, unwanted axial shifting of the spool due to a clearance, which is provided between the threads of the spool and the threads of the screw member for the smooth rotation of the screw member, is prevented. By this arrangement, a precise control of the opening of the throttling portion can be achieved.

Preferably, a reference position setting member screwed into the housing is provided, a spring for exerting an axial elastic force on the spool is disposed between the reference position setting member and the spool, according to the angle of rotation of the screw member, an opening of the throttling portion is controlled according to the axial shifting distance of the spool, with setting a position where the spool contacts with the reference position setting member up as a reference position, and the reference position is adjusted by changing the insertion depth of the reference position setting member into the housing. The manufacturing steps are simplified by disposing the spring for axially urging the spool between the spool and the reference position setting member screwed into the housing. Namely, the spring and the reference position setting member can be mounted in the housing only by screwing the reference position setting member into the housing after inserting the spring into the housing. Furthermore, the reference position of the shifting of the spool is accurately set by changing the insertion depth of the reference position setting member into the housing, so that the opening of the throttling portion can be precisely controlled.

Preferably, an actuator room formed in the housing with an opening is provided, the actuator is housed in the actuator room, and the opening of the actuator room is closed by a cover via a waterproof means. By housing the actuator in the actuator room via the waterproof means, the seal of the actuator against water can be achieved sufficiently at small cost.

A hydraulic power steering device according to the present invention comprises a hydraulic control valve having a plurality of throttling portions, the openings of which are varied according to steering resistance, and a hydraulic actuator for generating a steering assist force, wherein hydraulic oil pressure exerting on the hydraulic actuator for generating the steering assist force is controlled by varying the openings of the throttling portions according to steering resistance, the plurality of throttling portions in the hydraulic control valve are divided into a first group and a second group, the rate of change of hydraulic oil pressure according to change of steering resistance in the first group throttling portions is larger than that in the second group throttling portions, the variable throttle valve of the. present invention is connected to the hydraulic control valve so that the ratio of the flow rate controlled by the first group throttling portions to the flow rate controlled by the second group throttling portions can be changed, and means for controlling the actuator for rotating the screw member of the variable throttle valve according to a driving condition. In the hydraulic power steering device according to the present invention, the ratio of the flow rate controlled by the first group throttling portions to the flow rate controlled by the second group throttling portions can be changed by shifting axially the spool of the variable throttle valve of the present invention according to a driving condition. By changing the ratio, reliability of steering at high driving speeds and responsiveness of steering at low driving speeds are improved. By axial shifting of the spool, the opening of the throttling portions of the variable throttle valve can be controlled precisely, so that desired steering characteristics can be obtained.

DETAILED DESCRIPTION OF THE PREFERRED EMBODIMENTS (Embodiment 1)

Figure 1:
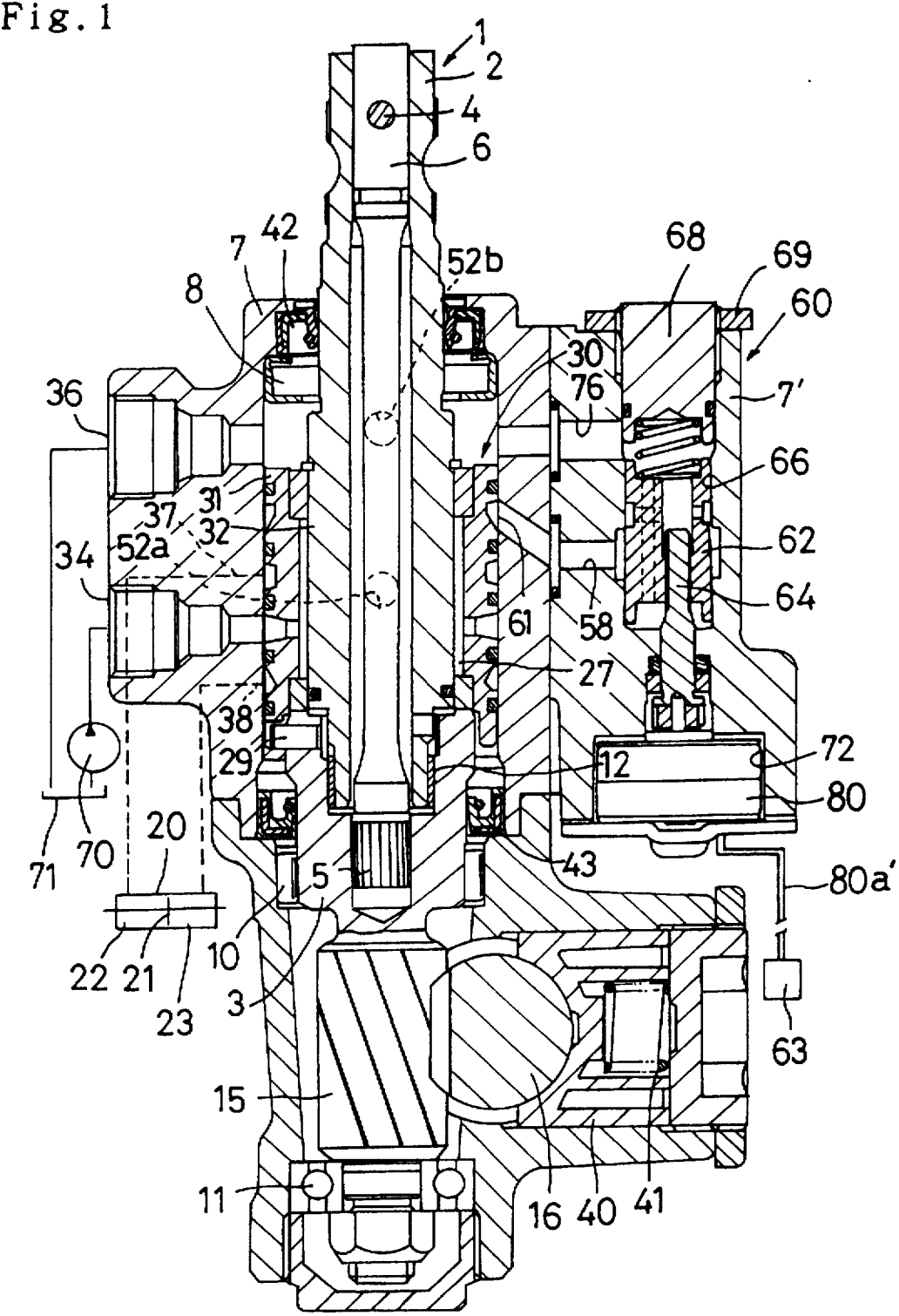
FIG. 1 is a vertical cross-sectional view showing the hydraulic power steering device according to a first embodiment of the present invention.

A rack and pinion gear type hydraulic power steering device 1 shown in FIG. 1 comprises an input shaft 2 connected to the steering wheel (not shown) of a vehicle, and an output shaft 3 connected to the input shaft 2 via a torsion bar 6. The torsion bar 6 is connected to the input shaft 2 by a pin 4 and connected to the output shaft 3 by its serration portion 5. The input shaft 2 is supported by a valve housing 7 via a bearing 8, and also supported by the output shaft 3 via a bearing 12. The output shaft 3 is supported by a rack housing 9 via bearings 10, 11. The output shaft 3 has a pinion portion 15, which is meshed with a rack 16 linked to a vehicle's wheels (not shown). The rotation of the input shaft 2 by steering operation is transmitted to the pinion 15 via the torsion bar 6. The rotation of the pinion 15 moves the rack 16 in the transverse direction of the vehicle, and the movement of the rack 16 causes the vehicle to be steered. Oil seals 42, 43 are disposed between the input shaft 2 and the housing 7 and between the output shaft 3 and the housing 7. A support yoke 40 which supports the rack 16 is urged to the rack 16 by a spring 41.

A hydraulic cylinder 20 is provided as a hydraulic actuator for generating steering assist force. The hydraulic cylinder 20 comprises a cylinder formed of the rack housing 9 and a piston 21 integrally formed with the rack 16. A rotary type hydraulic control valve 30 is provided to feed oil to oil chambers 22, 23, which are partitioned by the piston 21 so that one oil chamber 22 serves for generating right turn steering assist force and the other oil chamber 23 serves for generating left turn steering assist force according to the direction of steer and steering resistance.

The control valve 30 comprises a cylindrical first valve member 31 which is rotatably inserted in the valve housing 7, and a second valve member 32 which is inserted in the first valve member 31 so as to be coaxial and rotatable relative to the first valve member 31. The first valve member 31 is connected to the output shaft 3 via a pin 29 so as to be rotatable together with the output shaft 3. The second valve member 32 is integrally formed with the input shaft 2. Namely, the second valve member 32 is formed of the outer circumference of the input shaft 2, and thus the second valve member 32 is rotatable together with the input shaft 2. Therefore, twisting of the torsion bar 6 causes a coaxial relative rotation between the first valve member 31 and the second valve member 32.

An inlet port 34 connected to a pump 70, a first port 37 connected to one oil chamber 22 of the hydraulic cylinder 20, a second port 38 connected to the other oil chamber 23 of the hydraulic cylinder 20, a first outlet port 36 directly connected to a tank 71, and a second outlet port 61 connected to the tank 71 via a variable throttle valve 60 described later are formed on the valve housing 7. The ports 34, 36, 37, 38, 61 mutually communicate with each other via an oil flow path 27 between the inner circumference of the first valve member 31 and the outer circumference of the second valve member 32.

Figure 3:
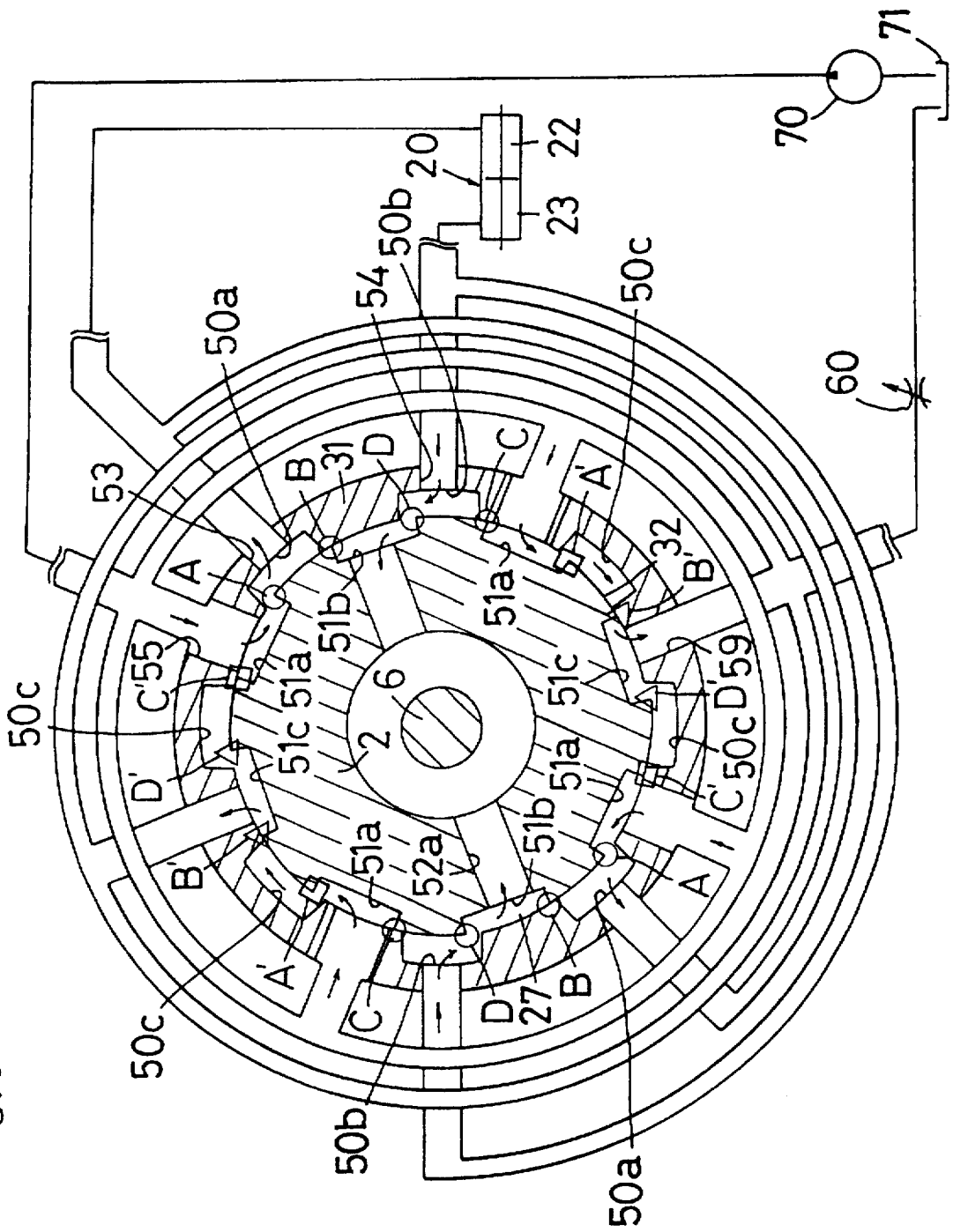
FIG. 3 is a cross-sectional view showing the control valve of the hydraulic power steering device.
Figure 4:
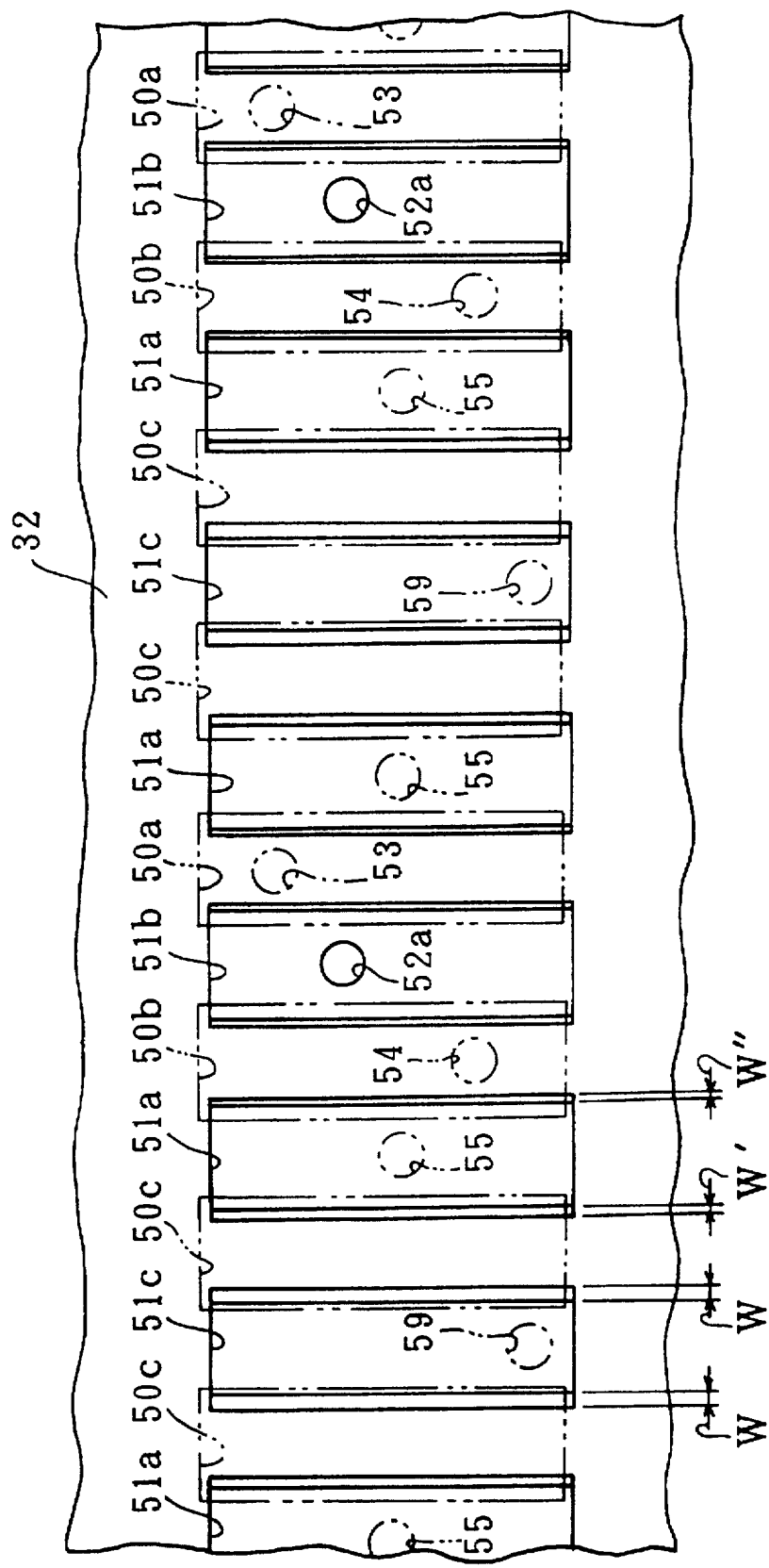
FIG. 4 is a development of the control valve.

As shown in FIG.3 and FIG.4, eight slots 50a, 50b, 50c circumferentially equally spaced to each other are formed on the inner circumference of the first valve member 31, and eight slots 51a, 51b, 51c circumferentially equally spaced to each other are formed on the outer circumference of the second valve member 32. In FIG.4, solid lines show a development of the second valve member 32, and chain lines show slots 50a, 50b, 50c formed on the first valve member 31. The slots 50a, 50b, 50c formed on the first valve member 31 alternate with the slots 51a, 51b, 51c formed on the second valve member 32.

The slots of the first valve member 31 consist of two right turn slots 50a, two left turn slots 50b, and four communication slots 50c. The two right turn slots 50a, which are angularly-spaced by 180° to each other, are connected to the right turn steering assist oil chamber 22 of the hydraulic cylinder 20 via flow paths 53 formed in the first valve member 31 and the first port 37. The two left turn slots 50b, which are angularly spaced by 180° to each other, are connected to the left turn steering assist oil chamber 23 of the hydraulic cylinder 20 via flow paths 54 formed in the first valve member 31 and the second port 38.

The slots formed on the second valve member 32 consist of four hydraulic oil feed slots 51a, two first hydraulic oil outlet slots 51b, and two second hydraulic oil outlet slots 51c. The four hydraulic oil feed slots 51a, which are spaced by 90° to each other, are connected to the pump 70 via oil inlet paths 55 formed in the first valve member 31 and the inlet port 34. The two first hydraulic oil outlet slots 51b, which are angularly spaced by 180° to each other, are connected to the tank 71 via oil flow paths 52a formed in the input shaft 2, the space between the input shaft 2 and the torsion bar 6, oil flow paths 52b (see FIG.1) formed in the input shaft 2, and the first outlet port 36. The two second hydraulic oil outlet slots 51c, which are angularly spaced by 180° to each other, are connected to a variable throttle valve 60 via oil flow paths 59 formed in the first valve member 31 and the second outlet port 61.

Each first hydraulic oil outlet slot 51b is located between the right turn slot 50a and the left turn slot 50b, each second hydraulic oil outlet slot 51c is located between the communication slots 50c. Two of the hydraulic oil feed slots 51a are respectively located between the right turn slot 50a and the communication slot 50c, and another two of the hydraulic oil feed slots 51a are respectively located between the left turn slot 50b and the communication slot 50c.

Spaces between axially extending edges defined by the slots 50a, 50b, 50c of the first valve member 31 and the axially extending edges defined by the slots of 51a, 51b, 51c of the second valve member 32 constitute throttling portions A, A', B, B', C, C', D, D'. The throttling portions A, A', B, B', C, C', D, D' are thus disposed in the oil flow path 27 via which the pump 70, the tank 71 and the hydraulic cylinder 20 communicate with each other.

Figure 5:
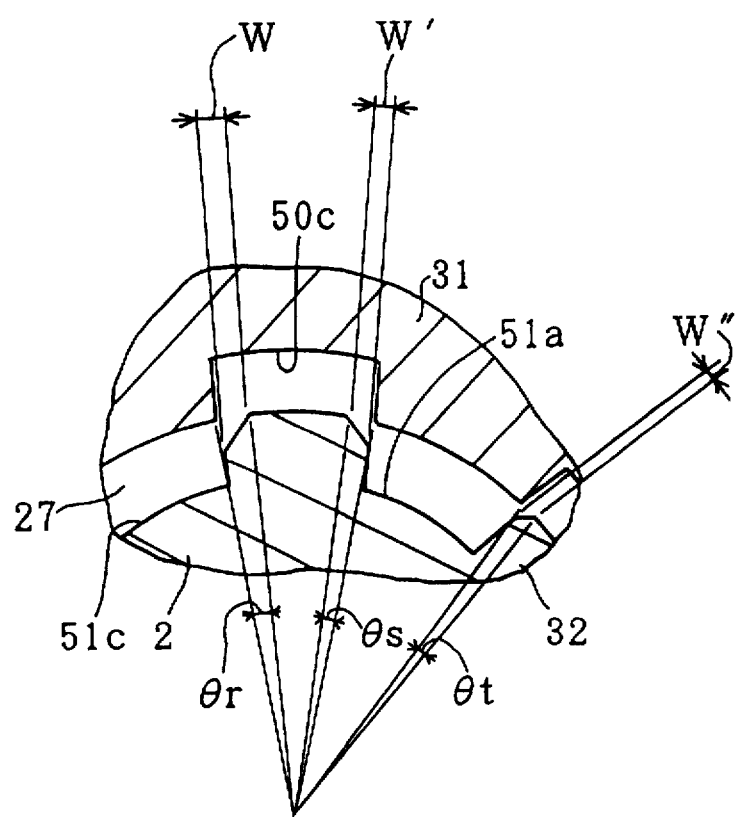
FIG. 5 is an enlarged view showing the essential portion of the control valve.

The axially extending edges defined by the slots 51a, 51b, 51c formed on the second valve member 32 are chamfered as shown in FIG.5. It is assumed that W is the width of each of the chamfer areas along the axially extending edges (marked by Δ in FIG.3) defined by the second hydraulic oil outlet slots 51c at the throttling portions B', D' between the communication slots 50c and the second hydraulic oil outlet slots 51c. It is assumed that W' is the width of each of the chamfer areas along the axially extending edges (marked by □ in FIG.3) defined by the hydraulic oil feed slots 51a at the throttling portions A', C' between the hydraulic oil feed slots 51a and the communication slots 50c. It is assumed that W" is the width of each of the chamfer areas along the axially extending edges (marked by ○ in FIG.3) defined by the remaining slots formed on the second valve member 32. The widths W, W', W" are related with each other as W>W'>W" as shown in FIG.4 and FIG.5.

The angle of relative rotation between the two valve members 31, 32 required to fully close each of the throttling portions A, A', B, B', C, C', D, D' in the state of no steering resistance (in the state of FIG.4 and FIG.5), i.e. the closing angle, is related as follows: the closing angle θr of each of the throttling portions B', D' between the communication slots 50c and the second hydraulic oil outlet slots 51c is greater than the closing angle θs of each of the throttling portions A', C' between the hydraulic oil feed slots 51a and the communication slots 50c; and both closing angles θr and θs are respectively greater than the closing angle θt of each of the remaining throttling portions A, B, C, D. The throttling portions between the first valve members and the second valve members are grouped into a first group throttling portions A, B, C, D and a second group throttling portions A', B', C', D', wherein the closing angle θr, θs of each of the second group throttling portions is larger than the closing angle θt of each of the first group throttling portions. The second group throttling portions are divided into two types. The second group throttling portions A', C' between the hydraulic oil feed slots 51a and the communication slots 50c belong to one type and the second group throttling portions B', D' between the communication slots 50c and the second hydraulic oil outlet slots 51c belong to another type, wherein the closing angle θs of each of one type of the throttling portions A', C' is smaller than the closing angle θr of each of another one type of the throttling portions B', D'.

Twist of the torsion bar 6 causes relative rotation between the input shaft 2 and the output shaft 3 in response to steering resistance, which is transmitted from road surfaces to the vehicle's wheels. The relative rotation between the input shaft 2 and the output shaft 3 causes a relative rotation between the first valve member 31 and the second valve member 32, so that the flow area of each of the throttling portions A, B, C, D, A', B', C', D' varies and consequently the hydraulic cylinder 20 generates steering assist force according to the steering resistance, and the direction of steer. The rate of change of hydraulic oil pressure according to change of steering resistance in the first group throttling portions A, B, C, D is larger than that in the second group throttling portions A', B', C', D', because the closing angle of each of the first group throttling portions A, B, C, D is smaller than that of each of the second group throttling portions A', B', C', D'.

FIG. 4 illustrates the state of no steering operation in which the, throttling portions A, B, C, D, A', B', C', D' between the both valve members 31, 32 are all opened and the inlet port 34 communicates with the outlet ports 36, 61 via the oil flow path 27 between both valve members 31, 32. In this state, hydraulic oil fed into the control valve 30 by the pump 70 is circulated back to the tank 71, so that no steering assist force generates.

When steering resistance resulting from right turn steering operation causes a relative rotation in one direction between the both valve members 31, 32, as shown in FIG. 3, the flow area of each of the throttling portions A between the hydraulic oil feed slots 51a and the right turn slots 50a and the flow area of each of the throttling portions A' between the hydraulic oil feed slots 51a next to the left turn slots 50b and the communication slots 50c are increased, the flow area of each of the throttling portions B between the right turn slots 50a and the first hydraulic oil outlet slots 51b and the flow area of each of the throttling portions B' between the communication slots 51c next to the hydraulic oil feed slots 51a next to the left turn slots 50b and the second hydraulic oil outlet slots 51c are decreased, the flow area of each of the throttling portions C between the hydraulic oil feed slots 51a and the left turn slots 50b and the flow area of each of the throttling portions C' between the hydraulic oil feed slots 51a next to the right turn slots 50a and the communication slots 50c are decreased, and the flow area of each of the throttling portions D between the left turn slots 50b and the first hydraulic oil outlet slots 51b and the flow area of each of the throttling portions D' between the communication slots 50c next to the hydraulic oil feed slots 51a next to the right turn slots 50a and the second hydraulic oil outlet slots 51c are increased. As a result, by oil flow as shown in arrows in FIG. 3, hydraulic oil pressure according to the steering resistance and direction of steer is applied to the right turn steering assist oil chamber 22 of the hydraulic cylinder 20 and hydraulic oil is circulated back to the tank 71 from the left turn steering assist oil chamber 23, so that steering assist force to steer toward the right of the vehicle is transmitted to the rack 16 from the hydraulic cylinder 20.

When a relative rotation in the other direction between the first Valve member 31 and the second valve member 32 is caused by left turn steering operation, since the flow area of each of the throttling portions A, A' is decreased, the flow area of each of the throttling portions B, B' is increased, the flow area of each of the throttling portions C, C' is increased, and the flow area of each of the throttling portions D, D' is decreased, steering assist force to steer toward the left of the vehicle is transmitted to the rack 16 from the hydraulic actuator 20.

Figure 8:
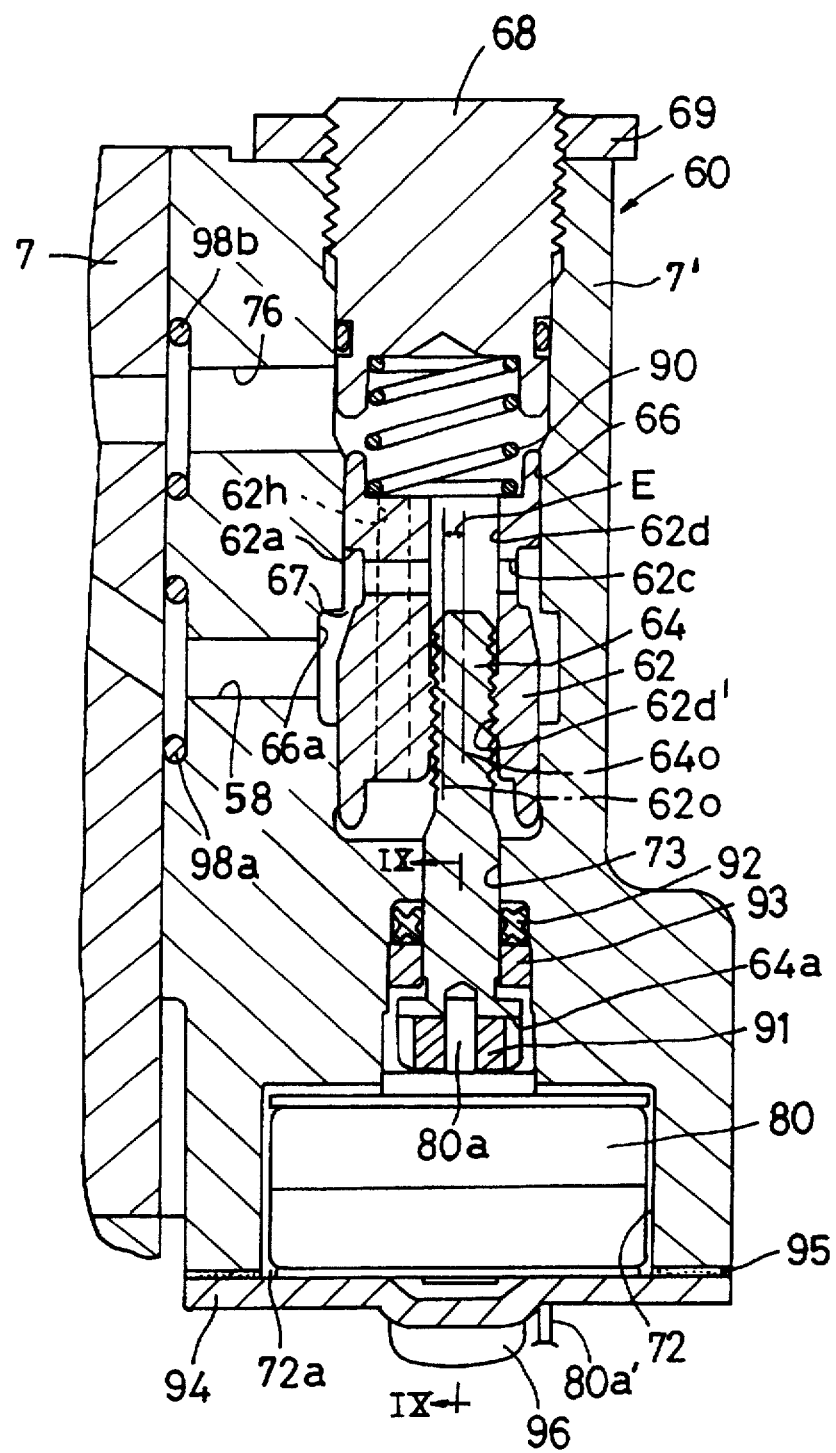
FIG. 8 is a vertical cross-sectional view showing the variable throttle valve in the hydraulic power steering device.

As shown in FIGS. 1 and 8, the variable throttle valve 60, which communicates with the second outlet port 61, comprises a second valve housing 7' connected to the housing 7, and a spool 62 which is axially movably inserted into an insertion hole 66 formed in the second housing 7' (along a vertical direction in FIGS. 1 and 8). The inner circumference of the insertion hole 66 and the outer circumference of the spool 62 are cylindrical.

The spool 62 has a through hole 62d whose centerline is eccentric to the centerline 62o of the spool 62. A female thread 62d' is formed on the lower portion of the through hole 62d. A screw member 64 is screwed to the female thread 62d'. As shown by E in FIG. 8, the centerline 62o of the spool 62 is thus eccentric to the centerline 64o of the screw member 64. One end of the insertion hole 66 is closed by a plug (a reference position setting member) 68 U-screwed into the housing 7' via a seal. A lock nut 69 locks the rotation of the plug 68. The other end of the hole 66 communicates with an actuator room 72 formed in the second valve housing 7' via a communication hole 73. The screw member 64 is inserted into the communication hole 73.

Figure 9:
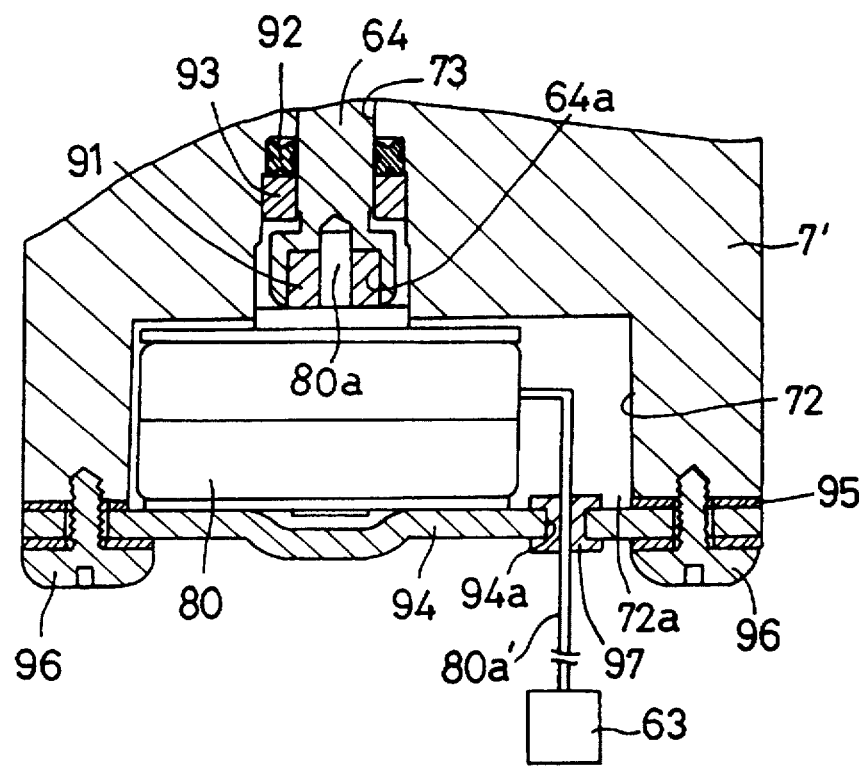
FIG. 9 is a cross-sectional view taken along line IX—IX in FIG. 8.

The actuator room 72 houses a stepping motor (actuator) 80 which rotates the screw member 64. As shown in FIGS. 8 and 9, the output shaft 80a of the stepping motor 80 is pressed into a rectangular parallelepiped block 91. The block 91 is received by a socket portion 64a formed on one end of the screw member 64 so that the rotation of the output shaft 80a can be transmitted to the screw member 64. A ring-shaped seal member 92 and a ring 93 for holding the seal member 92 are disposed between the outer circumference of the screw member 64 and the inner circumference of the actuator room 72.

The stepping motor 80 is welded onto a cover 94 which clones an opening 72a of the actuator room 72. The cover 94 is mounted onto the second valve housing 7' via waterproof sealpacking 95 by a plurality of screws 96. The waterproof sealing member is not limited to the packing, for example, an O-ring is acceptable as the sealing member. The stepping motor 80 is electrically connected to a controller 63 of a vehicle equipment via leads 80a'. As shown in FIG. 9, the leads 80a' are led out of the actuator room 72, through a waterproof rubber bushing member 97 fitted into a hole 94a formed in the cover 94.

The controller 63 connected to a speed sensor (not shown) controls the stepping motor 80 according to vehicle's speeds. To be more precise, at a high driving speed, the screw member 64 rotates in one direction so that the spool 62 shifts downwardly, and at a low driving speed, the screw member 64 rotates in the opposite direction so that the spool 62 shifts upwardly in FIG. 8.

A circular groove 62a' is formed on the outer circumference of the spool 62, and a circular groove 66a is formed on the inner circumference of the insertion hole 66. A space between both circular grooves 62a, 66a constitutes a throttling portion 67. The opening of the throttling portion 67 increases as the spool 62 is shifted downward in FIG. 8 at high driving speeds, and decreases as the spool 62 is shifted upward in FIG. 8 at low driving speeds.

A communication passage 58 is formed across the valve housing 7 and the second valve housing 7' to communicate the circular groove 66a on the inner circumference of the insertion hole 66 with the second outlet port 61. A ring-shaped seal member 98a is disposed between the valve housing 7 and the second valve housing 7' to prevent hydraulic oil leakage out of the communication passage 58. A radial passage 62c is formed in the spool 62 to communicate the circular groove 62a on the outer circumference of the spool 62 with the through hole 62d of the spool 62. The through hole 62d of the spool 62 communicates with the space above the spool 62. A oil flow path 76 is formed across the valve housing 7 and the second valve housing 7' to communicate the space above the spool 62 with the first outlet port 36. A ring-shaped seal member 98b is disposed between the valve housing 7 and the second valve housing 7' to prevent hydraulic oil leakage out of the oil flow path 76. In the above arrangement, hydraulic oil supplied by the pump 70 is led to the communication passage 58 through the oil flow path 27 and the second outlet port 61, and reaches the throttling portion 67 from the passage 58, and then circulates back to the tank 71 via the first outlet port 36 from the throttling portion 67. The spool 62 has a drain passage 62h formed parallelly with the through hole 62d to communicate the space above the spool 62 with the space below the spool 62.

According to the angle of rotation of the screw member 64, the opening of the throttling portion 67 is controlled according to the axial shifting distance of the spool 62. A position, where the top end of the spool 62 contacts with the bottom end of the plug 68, is set up as a reference position of the shifting of the spool 62. The reference position is adjusted by changing the insertion depth of the plug 68 into the second valve housing 7'.

A compression coil spring 90 is disposed between the plug 68 and the spool 62. The. spring 90 exerts an axial elastic force on the spool 62.

The maximum value of the flow area of the throttling portion 67 is set greater than the maximum value of the total flow area of the second group throttling portions A', B', C', D', or the throttling portion 67 is opened until the throttle valve 60 no longer throttles oil when the flow area of the throttling portion is maximum. The "maximum value of the total flow area" means a maximum value in the variation characteristic of the total flow area wherein the total flow area decreases as the relative angle of rotation of the valve members 31, 32 increases. To be more precise, under right turn steering condition the maximum valve means the maximum value of the total flow area of the throttling portions B' and C', under left turn steering condition it means the maximum value of the total flow area of the throttling portions A' and D'. This definition of the "maximum value of the total flow area" is applicable throughout this specification. The minimum value of the flow area of the throttling portion 67 is set smaller than the minimum value of the total flow area of the second group throttling portions A', B', C', D'. The "minimum value of the total flow area" means a minimum value in the variation characteristic of the total flow area wherein the total flow area decreases as the angle of relative rotation increases. To be more precise, under right turn steering conditions the minimum valve of the total flow area means the minimum value of the total flow area of the throttling portions B' and C', under left turn steering conditions it means the minimum value of the total flow area of the throttling portions A' and D'.

Figure 2:
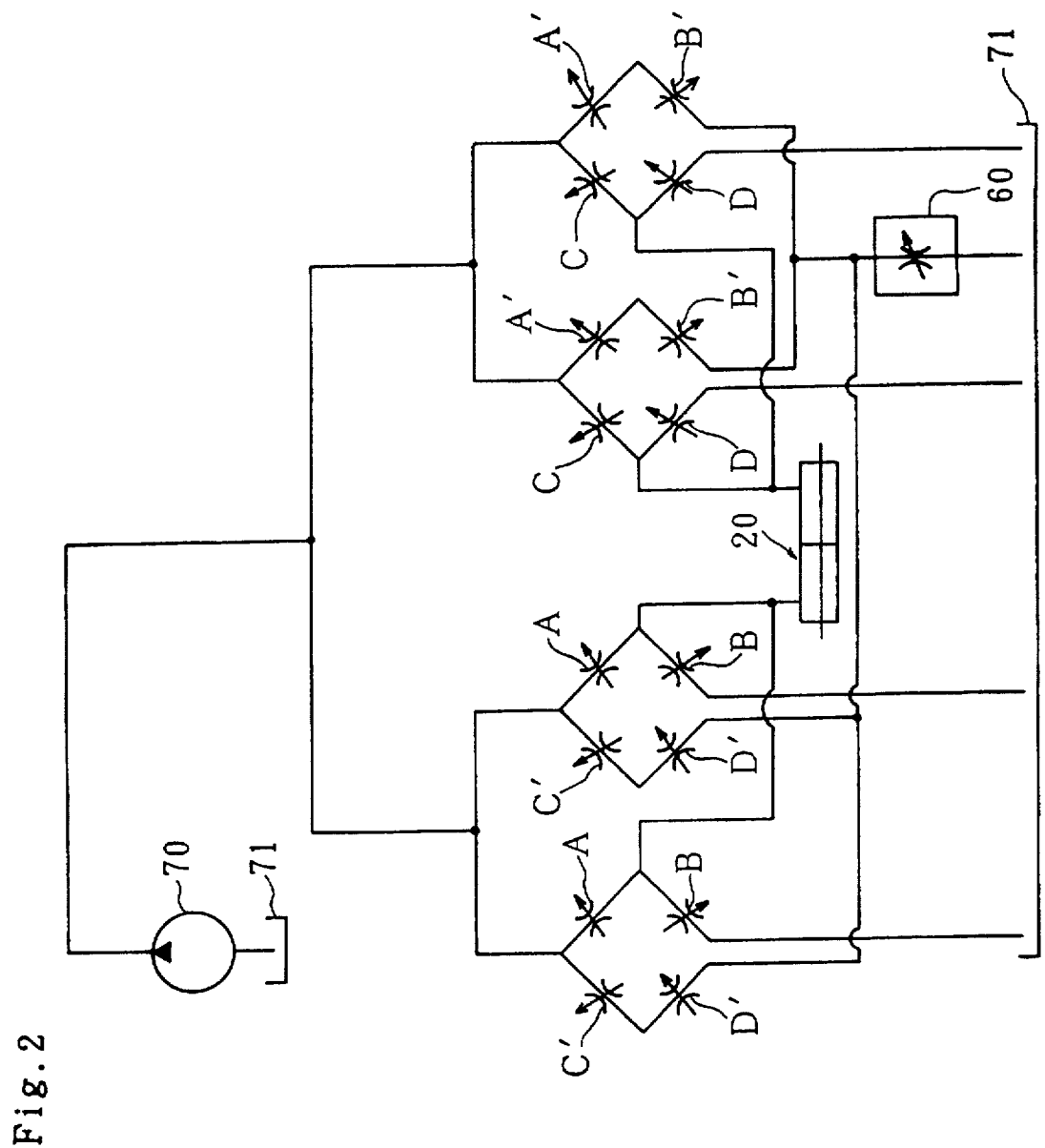
FIG. 2 is a hydraulic circuit of the hydraulic power steering device.

This arrangement constitutes the hydraulic circuit shown in FIG.2, wherein the flow area of the oil, flow path between the tank 71 and the second group throttling portions A', B', C', D' varies by operation of the variable throttling valve 60 according to the vehicle's speed. In other words, the ratio of the flow rate controlled by the first group throttling portions A, B, C and D to the flow rate controlled by the second group throttling portions A', B', C' and D' can be changed by the operation of the variable throttle valve 60.

Figure 7:
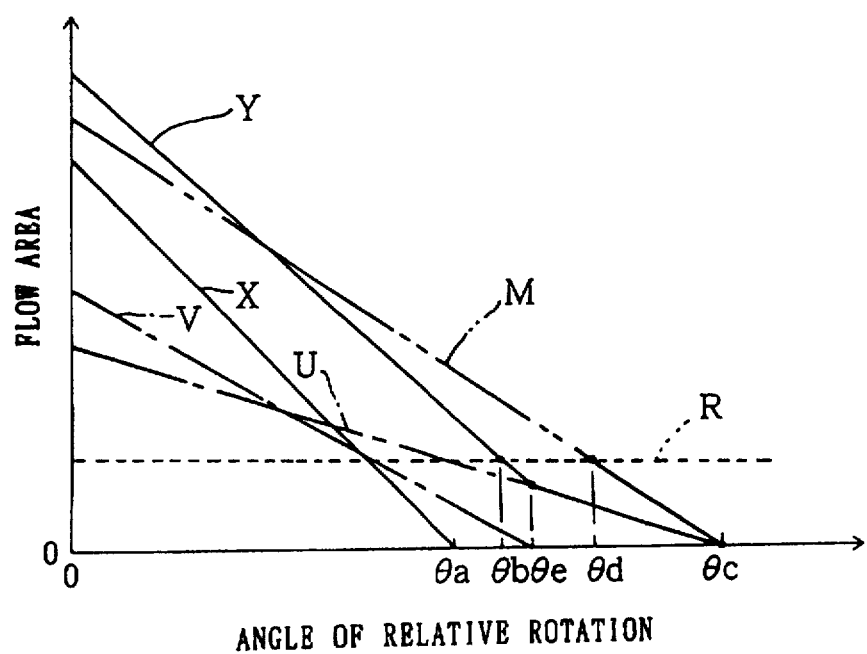
FIG. 7 shows the relationship between the flow area of the throttling portions of the control valve and the angle of relative rotation between the two valve members.

In FIG.7, a solid line X shows the variation characteristic of the total flow area of the first group throttling portions A, D or B, C versus the angle of relative rotation between both valve members 31, 32. An alternate long and short dash line U shows the variation characteristic of the total flow area of the second group throttling portions B' or D' between the communication slots 50c and the second hydraulic oil outlet slots 51c versus the angle of relative rotation. An alternate long and short dash line V shows the variation characteristic of the total flow area of the second group throttling portions A' or C' between the hydraulic oil feed slots 51a and the communication slots 50c versus the angle of relative rotation. A solid line Y, which is the combination of the line U and line V, shows the variation characteristic of the total flow area of the second group throttling portions A', D' or B', C' versus the angle of relative rotation. The dotted line R shows the flow area set by the variable throttle valve 60's own throttling portion 67 at medium driving speed.

Figure 6:
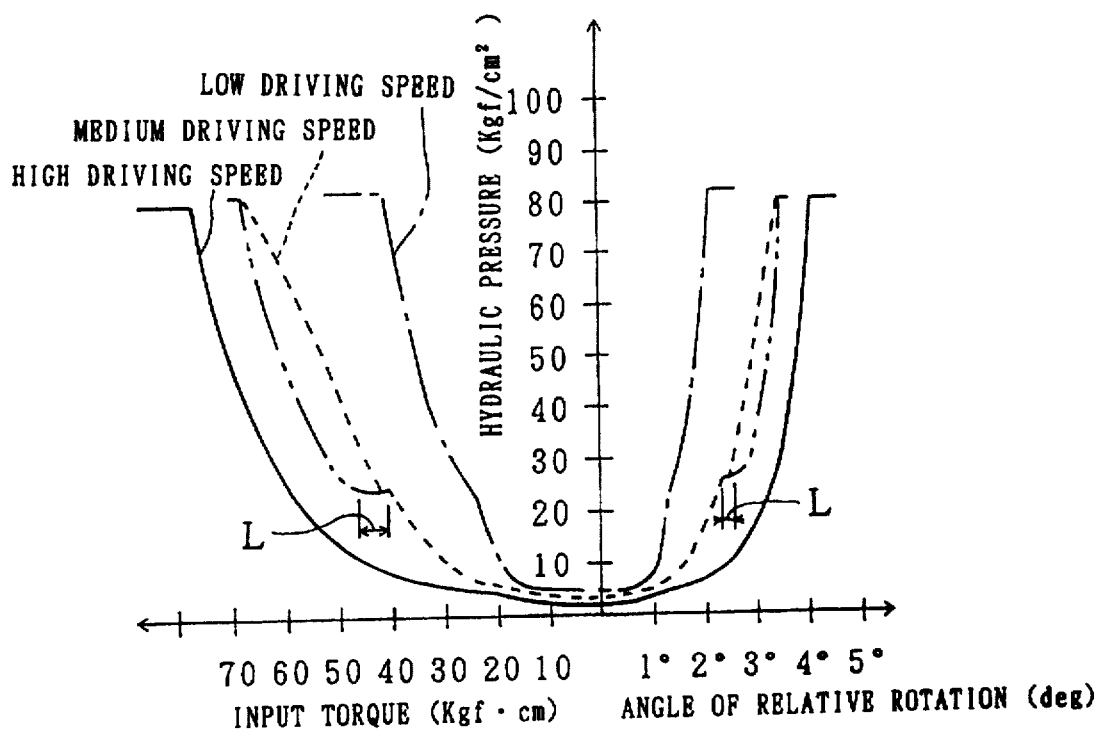
FIG. 6 shows the relationship between input torque for steering operation and hydraulic pressure and the relationship between the angle of relative rotation between the two valve members and hydraulic pressure, in the hydraulic power steering device.

According to the above constitution, under low driving speed condition, the spool 62 is shifted upward in FIG.1 and FIG.8. This upward shifting of the spool 62 causes the throttling portion 67 of the variable throttle valve 60 to be fully closed, so that hydraulic oil pressure acting on the hydraulic cylinder 20 is controlled according to only the variation characteristic shown by the line X of the total flow area of the first group throttling portions A, D or B, C. Therefore, as shown by the alternate long and short dash line in FIG.6, even when input torque for steering operation and angle of relative rotation between both valve members 31, 32 are small, the total flow area of the first group throttling portions A, D or B, C is reduced, and thus the rate of increase of hydraulic oil pressure for generating steering assist force is increased, so that fast response characteristic in steering operation at low driving speeds is achieved.

Under high driving speed condition, the spool 62 is shifted downward in FIG.1 and FIG.8. This downward shifting of the spool 62 causes the flow area of the throttling portion 67 of the variable throttle valve 60 to increase beyond the maximum value of the total flow area of the second group throttling portions A', D' or B', C', so that the hydraulic oil pressure acting on the hydraulic cylinder 20 is controlled according to a combined characteristic, which is the combination of the variation characteristic of the total flow area of the second group throttling portions A', D' or B', C' shown by the line Y and the variation characteristic of the total flow area of the first group throttling portions A, D or B, C shown by the line X. Therefore, as shown by the solid line in FIG.6, unless the angle of relative rotation between both valve members 31, 32 is increased by increasing input torque for steering operation, the total flow area of the second group throttling portions A', D' or B', C' is kept large without being decreased, and thus the rate of increase in hydraulic oil for generating steering assist force remains small, so that stable steering response characteristic in steering operation at high driving speed is achieved.

Under medium driving speed condition, the displacement of the spool 62 causes the flow area of the throttling portion 67 of the variable throttle valve 60 to be greater than the minimum value of the total flow area of the second group throttling portions A', D' or B', C' and smaller than the maximum value of the total flow area of the second group throttling portions A', D' or B', C'. Thereby, as shown by FIG.7, in the angular range where the total flow area of the first group throttling portions A, D or B, C is larger than the minimum value (i.e., before, the first group throttling portions reach the fully closed position in this embodiment, namely in the angular range where the angle of relative rotation between the two valve members is below θa in FIG.7), steering assist force generates in response to the combined characteristic, which is the combination of the line X representing variation characteristic of the total flow area of the first group throttling portions A, D or B, C and the line R representing the variation characteristic of the flow area of the throttling portion 67. In the angular range between the point where the first group throttling portions A, D or B, C reach the fully closed position and the point where the total flow area of the second group throttling portions A', D' or B', C' is smaller than the flow area of the throttling portion 67 of the variable throttle valve 60 (corresponding to the angular range between θa and θb in FIG.7), steering assist force remains a constant value determined by the flow area of the throttling portion 67. When the total flow area of the second group throttling portions A', D' or B', C' drops below the flow area of the throttling portion 67 of the variable throttle valve 60, steering assist force generates according to the variation characteristic shown by the line Y of the total flow area of the second group throttling portions A', D' or B', C'.

The difference between the point where the first group throttling portions A, D or B, C reach the fully closed position and the point where the total flow area of the second group throttling portions A', D' or B', C' is smaller than the flow area of the throttling portion 67 of the variable throttle valve 60 (corresponding to the angular difference between θa and θb) is narrowed without narrowing the difference between the point where the first group throttling portions A, D or B, C reach the fully closed position and the point where the second group throttling portions A', D' or B', C' reach the fully closed position (corresponding to the angular difference between θa and θc). To be more precise, suppose that the variation characteristic of the total flow area of the second group throttling portions A' or C' between the hydraulic oil feed slots 51a and the communication slots 50c is represented by the alternate long and short dash line U as is the variation characteristic of the total flow area of the throttling portions B' or D' between the communication slots 50c and the second hydraulic oil outlet slots 51c. The variation characteristic of the total flow area of the second group throttling portions A', D' or B', C' versus the angle of relative rotation is represented by an alternate long and two short dashes line M in FIG.7. In this case, the range between the point where the first group throttling portions A, D or B, C reach the fully closed position and the point where the total flow area of the second group throttling portions A', D' or B', C' is smaller than the flow area of the throttling portion 67 of the variable throttle valve 60 (corresponding to the angular difference between θa and θd) becomes wide, so that the range L where steering assist force is uncontrollable according to steering resistance becomes wide as shown by the alternate long and two short dashes line in FIG.6. But, in the above first embodiment, the closing angle θs of each of the second group throttling portions A', C' between the hydraulic oil feed slots 51a and the communication slots 50c is, smaller than the closing angle θr of each of the second group throttling portions B', D' between the communication slots 50c and the second hydraulic oil outlet slots 51c, so that the range where steering assist force is uncontrollable according to steering resistance can be narrowed under medium driving speed condition as shown by dotted line in FIG.6. Furthermore, at the point where throttling portions A' or C' between the hydraulic oil feed slots 51a and the communication slots 50c are fully closed (corresponding to the angle θe in FIG.7), throttling portions B' or D' between the communication slots 50c and the second hydraulic oil outlet slots 51c are yet to be opened. Thus, the range where steering assist force can be controlled in response to steering resistance is expanded, so that improved steering feel can be obtained. * In the above variable throttle valve 60, the centerline of the spool 62 is eccentric to the centerline of the screw member 64, so that the spool 62 is prevented from rotating together with the screw member 64. As a result, there is no need to provide dedicated components or machining steps for the flat surface to prevent the rotation of the spool 62 together with the screw member 64. Therefore, no extra component are required, and its structure and assembling remain simple, so that the manufacturing steps and cost are reduced. Since the spring 90 exerts an axial elastic force on the spool 62, an unwanted axial shifting of the spool 62 due to a clearance, which is provided between the threads of the screw member 64 and the female threads 62d formed in the through hole 62d of the spool 62 for the smooth rotation of the screw member 64, is prevented. The opening of the throttling portion 67 of the variable throttle valve 60 is thus controlled precisely, so that the desired steering characteristics can be obtained. Since the spring 90 and the plug 68 can be mounted in the valve housing 7' only by inserting the spring 90 into the valve housing 7' and then screwing the plug 68 into the valve housing 7', the manufacturing steps are simplified. Furthermore, by changing the insertion depth of the plug 68 into the valve housing 7', the reference position of the shifting of the spool 62 can be set precisely, so that the opening of the throttling portion 67 can be precisely controlled.

The opening 72a of the actuator room 72, which houses the stepping motor 80 for driving the variable throttle valve 60, is closed by the cover 94 via waterproof sealing packing 95, and the leads 80a' for connecting the stepping motor 80 to the controller 63 are led out of the actuator room 72 through the waterproof sealing rubber bushing 97 fitted in the hole 94a formed in the cover 94, so that waterproofness of the stepping motor 80 is sufficiently assured at low cost.

Furthermore, according to the first embodiment, the variable throttle valve 60, capable of varying its own throttling portion 67 according to driving conditions such as the vehicle's speed, is disposed in the oil flow path between the second group throttling portions A', B', C', D' and the tank 71, so that the difference between the hydraulic oil pressure in the point of the oil flow path wherein the second group throttling portions A', B', C', D' are disposed and the hydraulic oil pressure in the point of the oil flow path wherein the first group throttling portions A, B, C, D are disposed does not increase. This prevents the cross-sectional elliptical deformation of the first and second valve members 31, 32. In this arrangement, each of the first and second valve members 31, 32 is provided with eight slots; any block for interrupting communication between the first group throttling portions A, B, C, D and the second group throttling portions A', B', C', D' is not needed; and it is not needed that the first group throttling portions A, B, C, D are axially spaced from the second group throttling portions A', B', C', D'. These advantages contribute to the prevention of malfunction of the device, reduction in manufacturing costs, and compact design in radial and axial dimensions of the valve members 31, 32. Also, the four hydraulic oil feed slots 51a are mutually equally spaced, the two left turn slots 50b are mutually equally spaced, the two right turn slots 50a are mutually equally spaced, and the hydraulic oil feed slots 51a are adjacent the left turn slots 50b and the right turn slots 50a. This arrangement allows hydraulic pressure for generating steering assist force to act on the first and second valve members 31, 32 from circumferentially equally spaced two points. Therefore, this arrangement prevents the second valve member 32 from being pressed against the first valve member 31 by unbalanced hydraulic pressure, so that malfunction due to galling of both valve members 31, 32 can be prevented. Furthermore, at the point where throttling portions A' or C' between the hydraulic oil feed slots 51a and the communication slots 50c are fully closed (corresponding to the angle θe in FIG.7), throttling portions B' or D' between the communication slots 50c and the second hydraulic oil outlet slots 51c are yet to be opened. Thus, no sharp variation in the flow rate of hydraulic oil occur, so that sound due to oil flow can be lowered.

Figure 10:
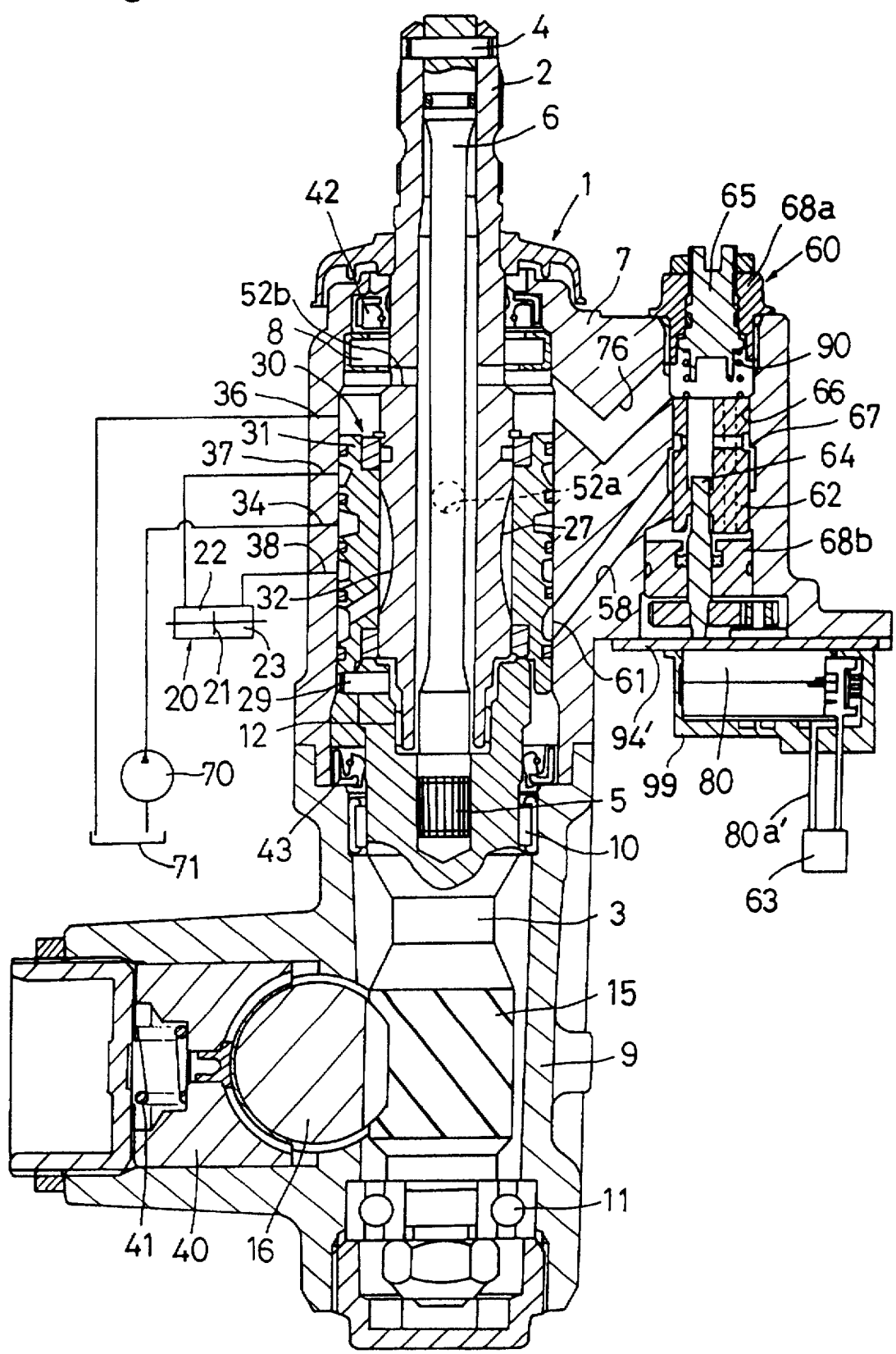
FIG. 10 is a vertical cross-sectional view showing the hydraulic power steering device according to a second embodiment of the present invention.
Figure 11:
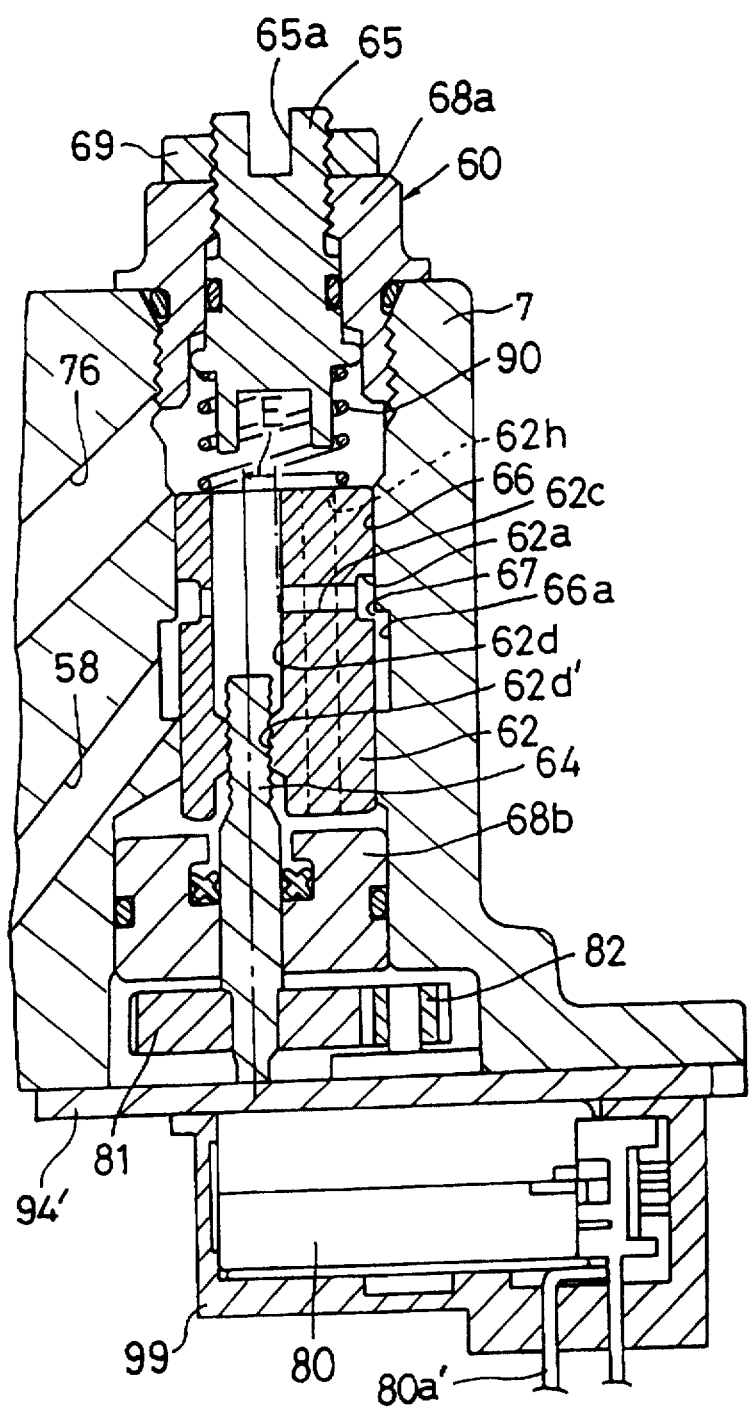
FIG. 11 is a vertical cross-sectional view showing the variable throttle valve of the second embodiment.

(Embodiment 2) FIGS. 10 and 11 show the second embodiment of the present invention. Where the second embodiment is identical to the first embodiment, the same reference numerals are used, and the difference from the first embodiment is explained. The spool 62 of the variable throttle valve 60 is axially movably inserted into the insertion hole 66 formed in the valve housing 7. One end of the insertion hole 66 is closed by a first plug 68a screwed in the housing 7 via a seal member, and the other end of the insertion hole 66 is closed by a second plug 68b pressed in the hole 66 via a seal member.

The screw member 64, which is screwed into the spool 62 with an eccentricity E as shown in the FIG. 11, penetrates the second plug 68b via a seal member. A reduction gear 81 is fitted to one end of the screw member 64. A pinion gear 82 meshed with the reduction gear 81 is fitted to the output shaft of the stepping motor 80 for rotating the screw member 64. The stepping motor 80 is mounted onto a cover 94' external to the valve housing 7. The cover 94' is attached to the valve housing 7 so as to close the insertion hole 66. A waterproof cover 99 attached to the cover 94' encloses the stepping motor 80.

The communication passage 58, which communicate the circular groove 66a on the inner circumference of the insertion hole 66 with the second outlet port 61, is formed in the valve housing 7. The radial passage 62c, which communicate the circular groove 62a on the outer circumference of the spool 62 with the through hole 62d, is formed in the spool 62. The through hole 62d of the spool 62 communicates with the space above the spool 62. The flow path 76, which communicate the space above the spool 62 with the first outlet port 36, is formed in the valve housing 7. In the first embodiment, the second outlet port 61 is positioned farther from the pinion 15 than the inlet port 34, first port 37, and second port 38, in this embodiment, the second outlet port 61 is positioned closer to the pinion 15 than those port 34, 37, 38.

An adjustment screw (reference position setting member) 65 having a tool socket portion 65a is screwed into the first plug 68a via a seal member concentrically with the spool 62. According to the angle of rotation of the screw member 64, the opening of thee throttling portion 67 is controlled according to the axial shifting distance of the spool 62. A position, where the top end of the spool 62 contacts with the bottom end of the adjustment screw 65, is set up as a reference position of the shifting of the spool 62. The reference position is adjusted by changing the insertion depth of the adjustment screw 65 into the plug 68a, namely the insertion depth into the housing 7.

A compression coil spring 90 is disposed between the flange formed on the outer circumference of the adjustment screw 65 and the top end of the spool 62. The spring 90 axially urges the spool 62. The rest of the second embodiment remains unchanged from the first embodiment.

Figure 12:
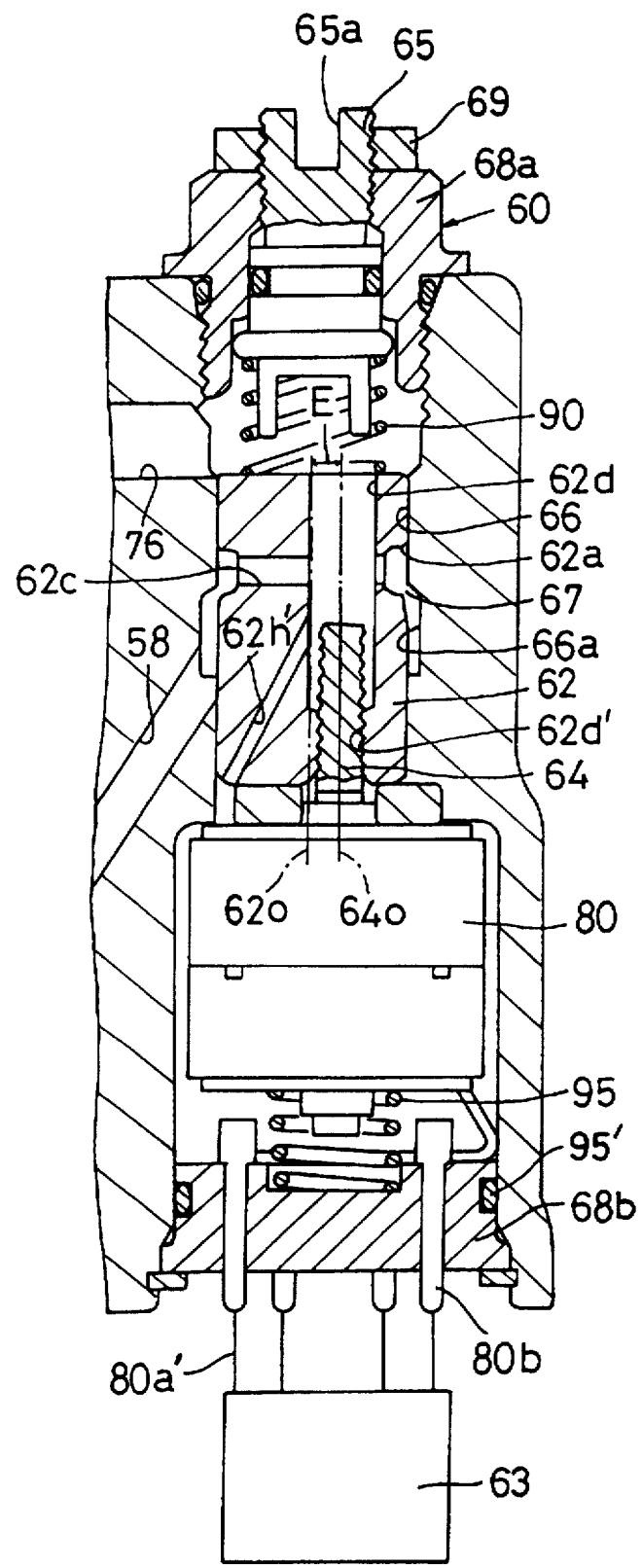
FIG. 12 is a vertical cross-sectional view showing the variable throttle valve according to a third embodiment of the present invention.

(Embodiment 3) FIG. 12 shows the third embodiment. The difference from the second embodiment is that the stepping motor 80 is housed in the actuator room 72 formed in the valve housing 7. The opening of the actuator room 72 is closed by a second plug (cover) 68b via waterproof O-ring 95'. The screw member 64 is directly fitted to the output shaft of the stepping motor 80. The leads 80a' of the stepping motor 80 are extended out of the actuator room 72, via pins 80b which pass through the second plug 68b, so as to be connected to the controller 63. A spring 95, which presses the motor 80 against a step portion formed on the inner circumference of the insertion hole 66, is disposed between the second plug 68b and the motor 80. The elastic force of the spring 95 prevents the motor 80 from rotating. A drain passage 62h' formed in the spool 62 is inclined to the through hole 62d. Via the passage 62d and the drain passage 62h', the space above the spool 62 communicates with the space below the spool 62. The rest of the third embodiment remains unchanged from the second embodiment, those components equivalent to the second embodiment are designated with the same reference numerals.

The variable throttle valve of the present invention is not limited to the above embodiments. For example, in the above embodiments, the present invention is applied to the rack-and-pinion type hydraulic power steering device, alternatively, the present invention can be applied to a ball screw type power steering device. The variable throttle valve of the present invention can be applied to hydraulic apparatuses other than the power steering device. In the above embodiments, the opening of the variable throttle valve is varied according to vehicle's speeds, alternatively, the opening of the variable throttle valve can be varied according to other conditions, such as angle of steer.

What is claimed is:

1. A variable throttle valve comprising:

a housing;

a spool that is axially movably inserted into the housing;

a screw member screwed into the spool and having a centerline that is eccentric to a centerline of the spool;

an actuator for rotating the screw member;

a throttling portion having an opening that is varied by an axial shifting distance of the spool as a result of rotation of the screw member;

an actuator room formed in the housing with an opening, the actuator being housed in the actuator room; and a cover which closes the opening of the actuator room via a waterproof means.

2. A hydraulic power steering device comprising:

a) a hydraulic control valve having a plurality of throttling portions having openings that are varied according to steering resistance;

b) a hydraulic actuator for generating a steering assist force;

wherein hydraulic oil pressure exerted on the hydraulic actuator for generating the steering assist force is controlled by varying the openings of the throttling portions according to steering resistance;

wherein the plurality of throttling portions in the hydraulic control valve are divided into a first group and a second group; and wherein a rate of change of hydraulic oil pressure according to change of steering resistance in the first group of throttling portions is larger than that in the second group of throttling portions;

c) a variable throttle valve including:

1) a housing;

2) a spool that is axially movably inserted into the housing;

3) a screw member screwed into the spool and having a centerline that is eccentric to a centerline of the spool;

4) an actuator for rotating the screw member; and 5) a throttling portion whose opening is varied by an axial shifting distance of the spool as a result of rotation of the screw member;

6) an actuator room formed in the housing with an opening, the actuator being housed in the actuator room; and 7) a cover which closes the opening of the actuator room via a waterproof means; and d) means for controlling the actuator for rotating the screw member of the variable throttle valve according to a driving condition;

wherein said variable throttle valve is connected to the hydraulic control valve so that a ratio of a flow rate controlled by the first group of throttling portions to a flow rate controlled by the second group of throttling portions can be changed.

3. A variable throttle valve comprising:

a housing;

a spool that is axially movably inserted into the housing;

a screw member screwed into the spool and having a centerline that is eccentric to a centerline of the spool;

an actuator for rotating the screw member;

a throttling portion having an opening that is varied by an axial shifting distance of the spool as a result of rotation of the screw member;

means for exerting an axial elastic force on the spool;

an actuator room formed in the housing with an opening, the actuator being housed in the actuator room; and a cover which closes the opening of the actuator room via a waterproof means.

4. A variable throttle valve comprising:

a housing;

a spool that is axially movably inserted into the housing;

a screw member screwed into the spool and having a centerline that is eccentric to a centerline of the spool;

an actuator for rotating the screw member;

a throttling portion having an opening that is varied by an axial shifting distance of the spool as a result of rotation of the screw member;

a reference position setting member screwed into the housing;

a spring for exerting an axial elastic force on the spool, disposed between the reference position setting member and the spool;

an actuator room formed in the housing with an opening, the actuator being housed in the actuator room; and a cover which closes the opening of the actuator room via a waterproof means;

wherein, according to an angle of rotation of the screw member, the opening of the throttling portion is controlled according to the axial shifting distance of the spool;

wherein a spool position at which the spool contacts the reference position setting member defines a reference position; and wherein the reference position is adjusted by varying an insertion depth of the reference position setting member into the housing.

* * * * *